Figure 1:
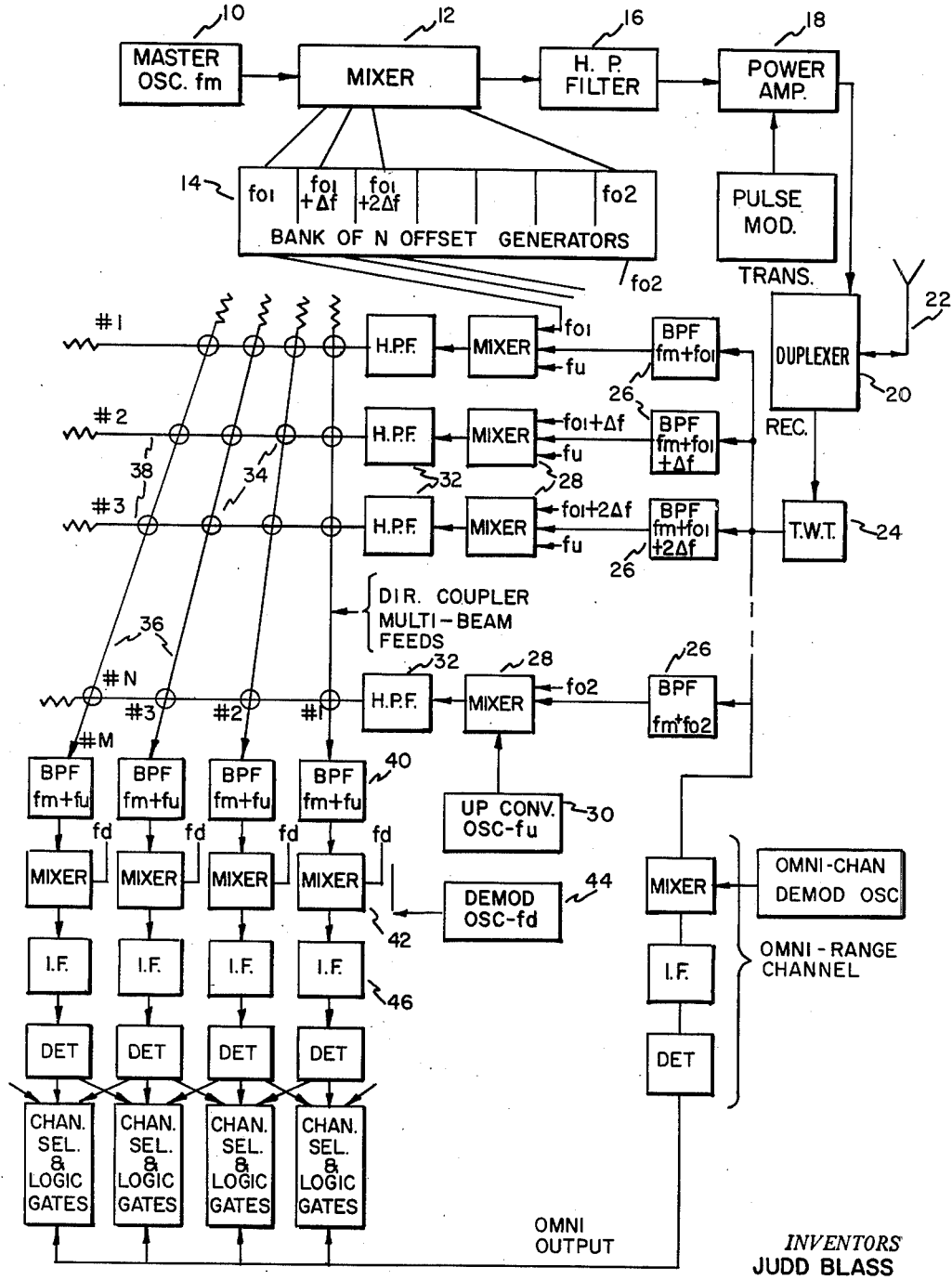

Oct. 12, 1965  J. BLASS ETAL  3,212,087

RANGE DETECTION SYSTEM

Filed Nov. 24, 1961  2 Sheets-Sheet 1

INVENTORS
JUDD BLASS
HAROLD SHNITKIN

BY Moses, Nolte + Nolte
Attorneys

United States Patent Office 3,212,087
Patented Oct. 12, 1965

3,212,087
RANGE DETECTION SYSTEM
Judd Blass, Flushing, and Harold Shnitkin, Roslyn, N.Y., assignors to Maxson Electronics Corporation, New York, N.Y., a corporation of New York
Filed Nov. 24, 1961, Ser. No. 154,454
5 Claims. (Cl. 343—13)

This invention relates to range detection systems and particularly to a system for increasing radar range resolution by simultaneous transmission of a plurality of frequencies and reception of reflected signals by a corresponding plurality of receivers.

In conventional radar, range resolution is a function of transmitter pulse width, with search accuracies in the order of one-half a pulse width and tracking accuracies within one-tenth pulse width being available. Improvement in range resolution is therefore directly dependent upon the possibility of producing narrower pulses. Narrower pulses, however, usually require high peak power in order to maintain the same receiver sensitivity with the accompanying wider receiver bandwidths. From the point of view of the transmitter amplifier and antenna, these peak powers may be impractical for certain combinations of maximum range and range resolution requirements.

The detection of very small radar targets in many cases is also made difficult by the existence of random radar reflections, generally known as clutter. The clutter received is a function of pulse widths employed, while the returned signal from the target is independent of the pulse width as long as the target dimensions are smaller than one-half the distance travelled by an electromagnetic wave in the pulse width interval. Consequently, by reducing pulse widths, the signal-to-clutter ratio can be improved. Furthermore, by making the receiver sensitive only for a fraction of the pulse width a sub-clutter visibility may be obtained.

It is therefore the primary object of the present invention to achieve high range resolution in a radar system by producing a plurality of effective narrow pulse widths without introducing high peak power values.

The instant invention employs a number of equi-spaced frequencies generated by a transmitter, with one receiver channel being utilized for each of these frequencies. In addition, one filter and one mixer for each channel and a network of directional couplers or hybrid structures are required to combine all the frequency channels into a number of range channels, each corresponding to a different range sector. The particular channel energized by the target will determine its range, thus offering a vernier to the range resolution provided by the received video pulse.

This system has some similarity to pulse compression devices in that the bandwidths are utilized without the accompanying high peakpower of narrow pulses to obtain additional range resolution. This is also accomplished without loss of range capability if equal average R.F. power is generated. In addition, a number of separate output channels are now made available so that many narrow range sectors can be monitored simultaneously. This makes it relatively simple to follow rapidly moving targets while determining their ranges to accuracies in the order of fractions of a meter. The system operates as a multi-frequency interferometer which effectively gates the receiver on for a fraction of the pulse width, and therefore can detect very small targets surrounded by a clutter environment.

The invention will be more fully understood and other objects and advantages will become apparent in the following description and accompanying drawings.

Figure 2:
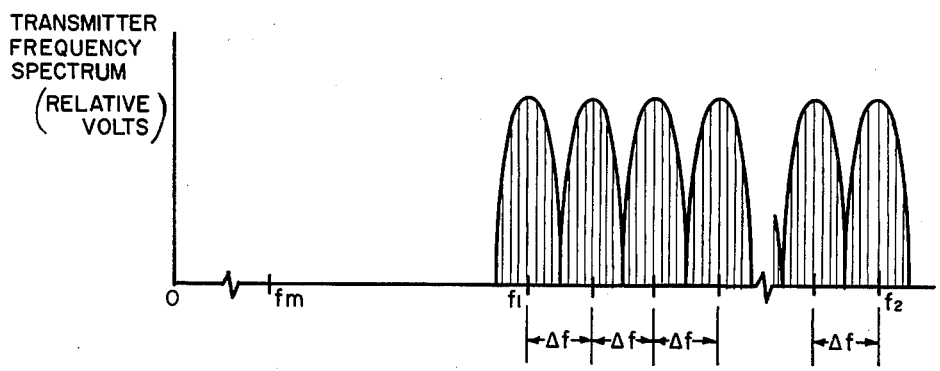
Figure 3:
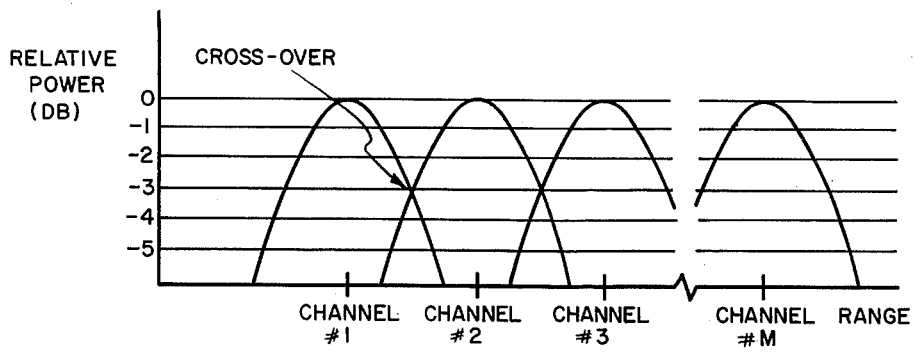

FIG. 1 shows a block diagram of a system utilizing the present invention;
FIG. 2 shows a representative transmitter frequency spectrum; and
FIG. 3 shows the response of a plurality of receiver range channels.

According to the principle of operation of this invention, if a number of signals differing in frequency by fixed amounts are transmitted and then reflected by a target, the received signals will differ not only in frequency but also in phase. The receiver phase in adjacent channels also differs by fixed amounts, proportional to both target range and difference between transmitter frequencies. Whenever this phase difference, $\Delta\phi$, is equal to $2\pi p$, or a multiple of 180°, where $p$ is an integer, all receiver channels will see the received signal in phase. Combining all receiver lines through an equi-phase network, after conversion to the same frequency, will result in maximum output only at those ranges where $\Delta\phi$ is equal to $2\pi p$. At other values or range, different receiver phase differentials are produced, so that the voltage in the combined output varies as $$\frac{\sin\left[\frac{2\pi N \Delta f}{3\times 10^8}(R-R_m)\right]}{N \sin\left[\frac{2\pi \Delta f}{3\times 10^8}(R-R_m)\right]} \quad (1)$$

where N is the number of frequencies; $\Delta f$ the frequency difference between adjacent channels; R the maximum range, and $R_m$ the range at an $m$ numbered channel. A further discussion of this relationship may be found in Kraus, "Antennas," 1950 edition, pp. 76–7.

The equation thus establishes a range selectivity for one range channel. If the different frequency lines, after suitable conversion to the same frequency, are coupled to each other, by means of a network establishing a constant phase differential between adjacent lines, maximum voltage or phase collimation, can be achieved for other values of R. An R.F. network setting up M different phase tapers is used to provide different phase delays determined by the angle at which the feed lines cross the different frequency lines, as employed in multi-directional antenna feeds. Thus, M output or range channels are provided, with each possessing a selectivity characteristic centered about one specific value of range. A large number of range intervals or subdivisions may be employed, however, space and weight considerations may limit M to numbers of less than 100 channels. Interpolation between fixed range channel outputs will then be possible by logic circuitry, which compares the voltages received from three adjacent channels and an omni-range input signal by means of "and" and "or" gates and selects the corresponding range, so that resolution may be improved to one-quarter the range differential between adjacent channels. Range resolution, $\Delta R$, is determined from the range of the adjacent channels, wherein $$R=\frac{1}{K}(R_{m+1}-R_m)$$

with K being the interpolation factor.

Ambiguities will arise if the phase difference, $\Delta\phi$, is changed by $\pm 2\pi$. Thus a sufficiently narrow pulse width must be selected to gate-out those range values producing phase differences outside the unambiguous range. Therefore, the M range channels effectively subdivide the pulse width into M sections.

A pulse width, T, as narrow as possible, should be chosen to provide as great a basic range accuracy as possible. The multi-frequency system is to be regarded simply as a vernier for interpolating to fractions of a pulse width. In any event, the range intervals corresponding to pulse width should be approximately equal to the total range difference between the first and the last range channel. Stated mathematically, this means that $$\frac{3 \times 10^8}{2T} = M(R_{m+1} - R_m) = Mk\Delta R$$

The following derivation relates the frequency difference between adjacent transmitters, $\Delta f$, to the above discussed parameters as follows:

The received phase at frequency $f_n$, or $$\phi_n = \frac{2\pi}{\lambda_n}(2R) = \frac{4\pi R}{3 \times 10^8} f_n$$

The received phase at frequency $f_{n+1}$ $$\phi_{n+1} = \frac{\pi R}{3 \times 10^8} f_{n+1} = \frac{4\pi R}{3 \times 10^8}(f_n + \Delta f)$$

Thus, $$\Delta\phi = \phi_{n+1} - \phi_n = \frac{4\pi R}{3 \times 10^8}\Delta f$$

Feeds must designed for $0 < \Delta\phi < 2\pi$, to avoid duplication. Therefore, $\Delta\phi_{m=1} = 0 + 2\pi p$, for the first feed, and $$\Delta\phi_{m=M} = 2\pi\left(1 - \frac{1}{M}\right) + 2\pi p$$

for the Mth feed, where $p$ is any integer.
By substitution:

$$0 + 2\pi p = \frac{4\pi R_1}{3 \times 10^8}\Delta f; \quad 2\pi\left(1 - \frac{1}{M}\right) + 2\pi p = \frac{4\pi R_M}{3 \times 10^8}\Delta f$$

$$2\pi\left(1 - \frac{1}{M}\right) = \frac{4\pi(R_M - R_1)}{3 \times 10^8}\Delta f$$

For M equi-spaced range channels $$R_M - R_1 = (M-1)(R_{m+1} - R_m)$$

therefore:

$$1 = \frac{2M(R_{m+1} - R_m)}{3 \times 10^8}\Delta f$$

but $$\Delta R = \frac{1}{K}(R_{m+1} - R_m)$$

thus $$M = \frac{150 \times 10^6}{K\Delta R\Delta f}$$

and $$\Delta f = \frac{150 \times 10^6}{MK\Delta R}$$

This shows that the frequency separation must increase for higher resolution and fewer range channels. Furthermore, combining this expression with the previous expression, involving pulse width, T, it can be shown that $$T = \frac{1}{\Delta f}$$

This will produce a transmitted frequency spectrum as shown in FIG. 2.

A typical range channel response curve is shown in FIG. 3. At the exact range for which the phase taper of a feed line has been designed, maximum output is obtained. For slightly differing values of range, the phase differences produced by the arriving signals will not be the same as those designed into the feed. Consequently, vector addition will produce voltage values which vary as Equation (1) above.

It is possible to design the system for different cross-over levels. The system response shown in FIG. 3 corresponds to a $-3$ db cross-over which is considered a good compromise between sensitivity at the edge of the range channel and cross-over slope, to guarantee that the correct range channel will be selected. This 3 db cross-over can be obtained if:

$$\frac{\sin\left[\frac{\pi N\Delta fK\Delta R}{3 \times 10^8}\right]}{N\sin\left[\frac{\pi\Delta fK\Delta R}{3 \times 10^8}\right]} = .71$$

Considering only small values of the arguments in the denominator $$\frac{\pi N\Delta fK\Delta R}{3 \times 10^8} \approx \frac{\pi}{2}; \quad N = \frac{150 \times 10^6}{K\Delta R\Delta f}$$

Therefore, $N = M$. This indicates that the value of N number of frequencies should be the same as M number of range channels.

According to the instant system, the average operating frequency $f_0$ is given by:

$$f_0 = f_m + \frac{1}{2}(f_2 - f_1)$$

where $f_m$ is a master oscillator frequency, $f_2$ is the maximum and $f_1$ the minimum frequencies. The choice for $f_0$ depends upon two considerations: the fractional bandwidth to be transmitted and the Q of the filter, ($Q_F$), required for separating adjacent channels. The ratio $N\Delta f/f_0$ gives the fractional transmitted bandwidth, while the center frequency in terms of loaded filter Q and frequency difference between adjacent channels is expressed as:

$$f_0 = \frac{Q_F\Delta f}{2}$$

The latter assumes a single resonator filter, having a 10 db rejection at cross-over, and 20 db rejection at the center of the adjacent frequency spectrum. It appears therefore that the maximum frequency is limited by the filter Q criterion, while the minimum frequency is limited by the transmitter bandwidth criterion.

The system noise bandwidth is given by $N\Delta f$. The wide simultaneous bandwidth required necessitates the use of one or more travelling wave tube amplifiers with their associated noise figure. The range of the system is therefore figured on the basis of the sum of the peak power transmitted at all frequencies and the noise bandwidth, $N\Delta f$. This is equivalent to stating that range depends upon total average power.

The present system also avoids high peak powers by generating the various frequencies at arbitrary phases. This requires mixing the received signal with a signal which is phase synchronized to the particular transmitted frequency to subtract this arbitrary phase in the receiver. The statistical transmitter peak power level will then be the product of the number of simultaneous frequencies, N, and the peak power at each frequency.

A comparison between the range capability of a single frequency and a multi-frequency radar system must be based on the ratio of received power, $E^2_{R_1}$ (assuming unit impedance), to $P_1$, the transmitted power. For a single frequency, this ratio may be expressed as $\gamma$, where $\gamma$ is a constant involving antenna gain, wave length, range and target area. Therefore, $E^2_{R_1} = \gamma P_1$. If simultaneous transmission of N equi-powered frequencies is employed, the above relation holds for each frequency. The particular range channel providing in-phase voltage addition of the received signal will then yield an output voltage:

$$E_{R_T} = E_{R_1} + E_{R_2} + E_{R_3} + \ldots E_{R_N} = NE_{R_1}$$

Therefore, $$E^2_{R_T} = N^2 E^2_{R_1} = N^2\gamma P_1$$

Now the ratio of received power to transmitter power is:

$$\frac{E^2_{R_T}}{NP_1} = N\gamma$$

or N times as great as for a single frequency radar.

However, multi-frequency transmission is accompanied by N times as great a bandwidth, so that receiver noise power will also be N times as great. Thus the ratio of total receiver power to total transmitter power remains constant at γ. This means that increasing the transmitter power by utilizing additional frequencies has the same affect upon range as increasing transmitter power (by the same amount) by additional pulse amplitude or pulse width.

A complete system based upon range resolution by multiple frequency transmission is shown in FIG. 1. The transmitter consists of a master oscillator 10 producing a master frequency $f_m$, which is combined in mixer 12 with a band of N offset generator frequencies 14 differing by equal amounts. A high pass filter 16 is incorporated to block the lower modulation side bands or images and a pulse modulated power amplifier 18 is used to generate the narrow pulse needed for ambiguity resolution of the side band transmitted signal. Actual radiation takes place through a duplexer 20 and antenna system 22 in a well known manner.

The receiver consists of a travelling wave tube preamplifier 24 which can accommodate a wide frequency range and a multiplexing divider comprising a group of parallel band pass filters 26 directing each of the received signals through a separate filtered channel. The received signal is demodulated to reproduce the master frequency which then appears in the various channels with different phase displacements. Each channel contains a demodulating mixer 28 to subtract the offset generated frequency and phase, while simultaneously introducing an up-frequency. Since the master frequency is relatively low, the wave guides and other components involved, would be relatively large. Thus, for convenience and economy, particularly in the microwave plumbing, the signals in these various channels are modulated up to a higher frequency range using a common higher frequency carrier which is referred to as the up-frequency, $f_u$, as generated in an up-converter oscillator 30. The high pass filter 32 following the mixer then selects a frequency equal to the sum of the master oscillator and the up-converting oscillator frequencies while rejecting the lower side band.

A number of directional couplers 34 are used to form vector additions between the voltages in the various frequency channels. This addition is performed by M feed coupling lines 36, each one of which introduces a fixed phase differential coupling between adjacent lines by forming a different angle at the crossings of the N parallel frequency lines 38. Each of the feed lines will correspond to a different range sector. Additional band pass filters 40 to guard against unwanted frequency components generated in the mixers, couple the M range channel outputs to demodulating mixers 42 having a demodulating frequency $f_d$ applied by oscillator 44, and to intermediate frequency amplifiers 46 and channel selectors 48. The latter include logic circuitry for range sector interpolation into the desired number of parts. The use of directional couplers and feed lines to obtain outputs differing from each other by controlled amounts of phase change and the logic circuitry which can be employed for range sector selections and interpolation between adjacent channels, including the use of "and" and "or" gates which are compared with an omni-range input, is described more fully in copending application No. 25,151, filed April 27, 1960 and assigned to the same assignee as the instant application now abandoned.

Two types of structures may be employed for the equal phase taper feed lines. These include cross guide directional couplers together with a waveguide structure as indicated in FIG. 1, or 3 db hybrids in a strip line structure. The choice here depends upon size requirements and ease of construction.

The instant multi-frequency system is thus capable of achieving high range resolution within fractions of a pulse width by utilizing narrow pulses. A resolution of 25 centimeters, or less than one foot, is possible with quarter-microsecond pulses utilizing a system of 38 frequencies and channels. In addition, neither bandwidth nor the filter Q requirements are excessive at frequencies between 1,000 and 4,000 megacycles. The use of simultaneous range channels also permits groups or range sectors to be monitored simultaneously and thus provides simple tracking of a number of closely spaced and rapidly moving targets without the danger of losing track. While only a single embodiment has been illustrated, it is apparent that the invention is not limited to the exact form or use shown and that many variations may be made in the particular design and configuration without departing from the scope of the invention as set forth in the appended claims.

What is claimed is:

1. A radar range detection system comprising means for simultaneously transmitting a plurality of closely spaced different frequency pulses, means for receiving reflected signals from said frequencies in a corresponding plurality of spaced frequency channels, each said channel being tuned to accept only one discrete frequency, and means for coupling every one of said discrete frequencies to provide corresponding phase displaced signals in each of said channels representing different selected range sectors.

2. A radar range detection system comprising transmitter means having a master frequency oscillator and a plurality of off-set frequency generators producing a plurality of narrow pulses of discrete equally-spaced frequencies, receiver means having a corresponding plurality of channels, each said channel being tuned to receive reflected signals of one of said discrete frequencies, means for demodulating said frequencies to provide said master frequency with a different phase displacement in each said channel, a plurality of differently tapered feed lines and directional coupling means connecting said feed lines to said channels to establish a constant phase difference between adjacent channels.

3. The device of claim 2 wherein said transmitter includes a high pass filter and pulse modulated power amplifier, said receiver includes a travelling wave tube preamplifier and said transmitter and receiver include a common antenna and duplexer.

4. The device of claim 3 wherein said receiver includes a first band pass filter, a first demodulating mixer and a high pass filter in each of said channels and a second band pass filter, a second mixer and an intermediate frequency amplifier in each said output line.

5. The device of claim 4 wherein said receiver includes an up-frequency generator increasing the operating frequency of said demodulating means and channels.

References Cited by the Examiner
UNITED STATES PATENTS 2,712,646 7/55 Lawson _____ 343—5

CHESTER L. JUSTUS, *Primary Examiner.*